United States Patent [19]

Haga et al.

[11] 4,452,274

[45] Jun. 5, 1984

[54] ROTARY VALVE FOR POWER STEERING SYSTEM

[75] Inventors: Kyosuke Haga, Anjo; Tsuneo Tanaka, Okazaki, both of Japan

[73] Assignee: Toyoda Koki Kabushiki Kaisha, Kariya, Japan

[21] Appl. No.: 268,380

[22] Filed: May 29, 1981

[30] Foreign Application Priority Data

May 30, 1980 [JP] Japan ................................. 55-73607

[51] Int. Cl.³ ............................................. F15B 9/10
[52] U.S. Cl. ............................ 137/625.22; 91/375 A
[58] Field of Search ..................... 137/625.21, 625.22, 137/625.23, 625.69; 91/375 A, 375 R

[56] References Cited

U.S. PATENT DOCUMENTS

| | | | |
|---|---|---|---|
| 3,556,155 | 1/1971 | Morris | 137/625.69 |
| 3,591,136 | 7/1971 | Bishop | 251/209 |
| 3,645,296 | 4/1972 | Adams | 137/625.69 |
| 3,867,870 | 2/1975 | Shimoura | 91/375 A X |

*Primary Examiner*—Alan Cohan

*Attorney, Agent, or Firm*—Oblon, Fisher, Spivak, McClelland & Maier

[57] ABSTRACT

A rotary valve for a power steering system includes a valve sleeve in which a rotor is rotatably carried for controlling fluid flow from a supply pump to a cylinder of the power steering system. A plurality of lands are formed on the outer periphery of the rotor, at least three of which have the same configuration. A plurality of lands are formed on the inner periphery of the valve sleeve, at least two of which have the same configuration to thereby vary the areas of two orifices formed between the three lands of the rotor and the two lands of the valve sleeve at the same rate during relative rotation therebetween. Further, the edge portions of the three lands of the rotor are formed with two longitudinally curved slopes so as to provide an optimum two-step valving characteristic. Furthermore, two of lands formed on the rotor have at each side edge portion thereof a longitudinaly curved and radially extending wall so as to form additional orifice areas to provide an optimum valving characteristic by combining the same with the above two orifice areas.

2 Claims, 17 Drawing Figures

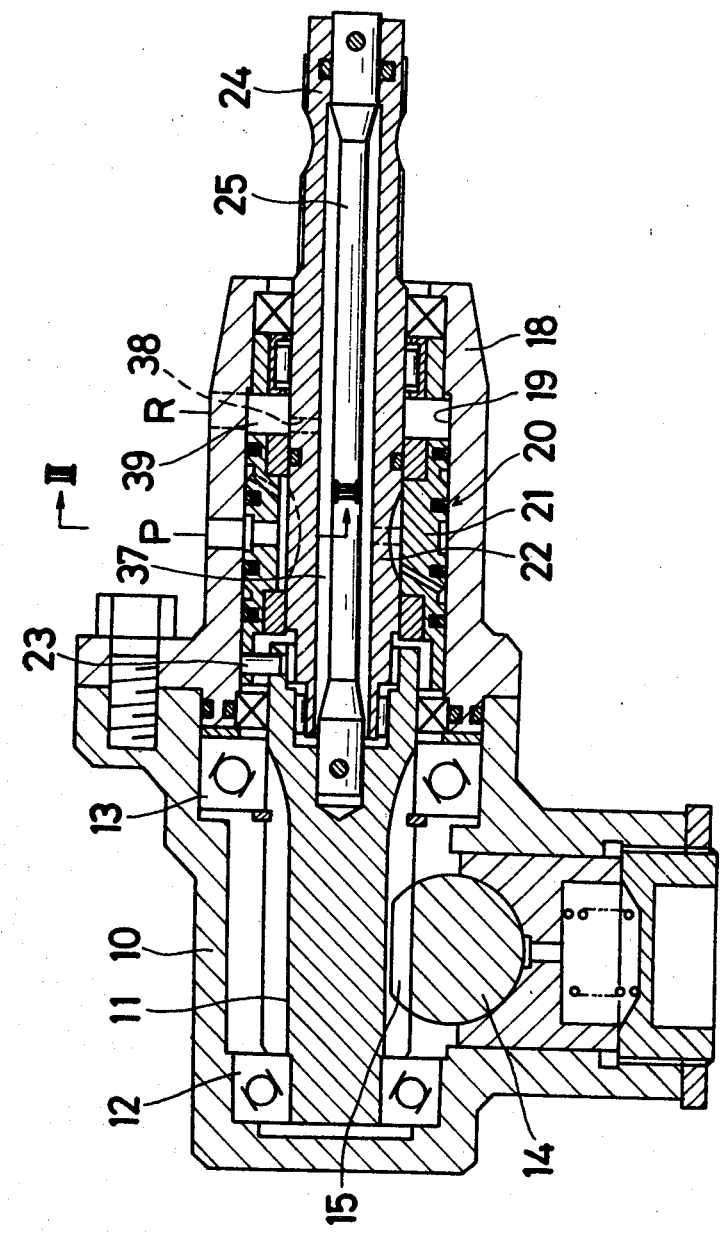

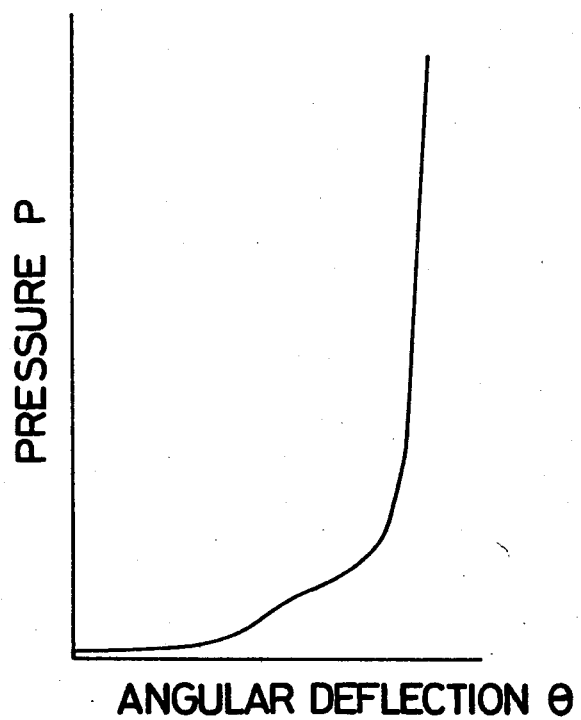

ROTARY VALVE FOR POWER STEERING SYSTEM

BACKGROUND OF THE INVENTION

1. Field of the Invention

The present invention relates to a rotary valve for a power steering system.

2. Description of the Prior Art

In a conventional rotary valve for a power steering system as shown in FIGS. 1(a) and 1(b), there is provided a valve sleeve 1 in which a rotor 2 is rotatably received. The valve sleeve 1 is formed with supply ports 5 and cylinder ports 6A, 6B therein and serveral axially extending lands on the inner periphery thereof. The rotor 2 is formed with several axially extending lands 3 and 4 alternatively on the outer periphery thereof, wherein the lands 3, provided with exhaust ports 8A and 8B, and the lands 4 cooperate with the lands of the valve sleeve 1 for controlling fluid distribution and fluid pressure to a power cylinder, respectively.

In such a conventional rotary valve, when the rotor 2 is in a neutral position as shown in FIG. 1(a), pressurized fluid supplied from a pump through the supply ports 5 is equally divided and discharged to a reservoir through the exhaust ports 8A and 8B, but when the rotor 2 is rotated, for example, in a counterclockwise direction as shown in FIG. 1(b), the lands 3 are moved to shut off the fluid communication between the supply ports 5 and the exhaust port 8A to thereby increase fluid pressure applied to the cylinder in accordance with the rotational angle $\Delta\theta$ relative to the valve sleeve 1. As a result, pressurized fluid is discharged to the exhaust port 8B only through an orifice 7 formed between the land 4 and the valve sleeve 1. Accordingly, the fluid volume passing through the orifice 7 is increased in proportion to the rotation of the rotor 2 relative to the valve sleeve 1. This increase causes the generation of cavitation and unpleasant noise, such as hissing noise. It is known that this disadvantage can be avoided by reducing flow volume passing through the orifice.

SUMMARY OF THE INVENTION

Accordingly, it is an object of the present invention to provide an improved rotary valve for a power steering system, which is capable of preventing the generation of cavitation and hissing noise by discharging fluid through several orifices to a reservoir so as to reduce the flow volume passing through each one of the orifices.

Another object of the present invention is to provide an improved rotary valve for a power steering system, which has an improved configuration to provide an optimum orifice area curve and offer a "feel" required for truly optimum steering to a vehicular driver.

Briefly, according to the present invention, these and other objects are achieved by providing a rotary valve for a power steering system, as described below. The rotary valve is provided with an outer valve member in which an inner valve member is rotatably carried. A supply port and two cylinder ports are formed in the outer valve member. Two exhaust ports are formed in the inner valve member. At least two lands, which define the two cylinder ports therein, are formed on the inner periphery of the outer valve member and have identical configurations. A slot is formed on the inner periphery of the outer valve member between the two lands and locates the supply port therein. A plurality of lands are formed on the outer periphery of the inner valve member. Three of the plurality of lands formed on the inner valve member have the same configuration at the edge portions thereof, the middle one of which faces the slot of the outer valve member, to thereby vary the areas of orifices formed between the two lands of the outer valve member and the three lands of the inner valve member at the same rate during relative rotation between the outer and inner valve members. Fluid supplied from the supply port is discharged to the two exhaust ports through the orifices.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which:

FIG. 2 is a sectional view of a power steering system utilizing a rotary valve according to the present invention;

FIG. 8 is a graph showing the relation between the angular deflection of the rotor relative to the valve sleeve and the pressure;

DETAILED DESCRIPTION OF THE PREFERRED EMBODIMENTS

Figure 1A:
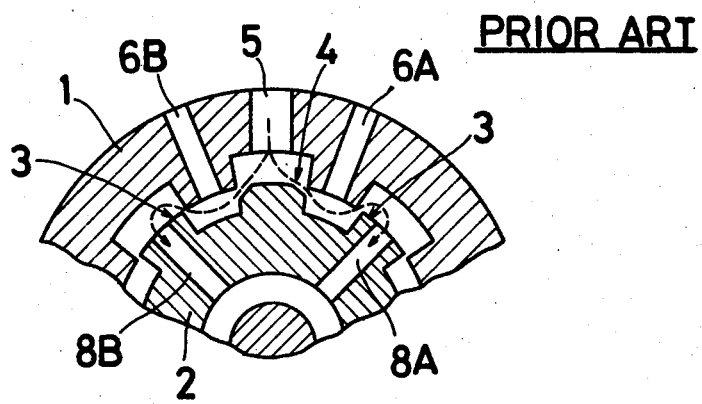
FIG. 1(a) is a cross-sectional view of a conventional rotary valve with a rotor being in a neutral position relative to a valve sleeve.

Referring now to the drawings, wherein like reference numerals or characters refer to identical or corresponding parts throughout the several views, and more particularly to FIG. 2, there is shown a rack and pinion power steering system utilizing a rotary valve 20 according to the present invention. Reference numeral 10 denotes a housing in which a pinion shaft 11 is rotatably received through bearings 12 and 13 mounted therein. The pinion shaft 11 is provided with a pinion gear which is in mesh with a rack 15 provided on a rack shaft 14 which is slidably received in the housing 10 in the transverse direction of the axis of the pinion shaft 11. The end portions of the rack shaft 14 are suitably connected to front wheels of a vehicle through a steering linkage assembly in a well-known manner. The rack shaft 14 is also operatively connected to a piston 17 in a power cylinder 16 shown in FIG. 3(a) for power steering operation.

Secured to the housing 10 is a valve housing 18 provided with a valve chamber 19 in which the rotary valve 20 according to the present invention is rotatably received. The rotary valve 20 comprises a valve sleeve 21 and a rotor 22 which are rotatable with respect to each other about the axis of the pinion shaft 11. The valve sleeve 21 is connected to the pinion shaft 11 through a connecting pin 23 and the rotor 22 is constructed as a portion of a steering shaft 24 which is elastically connected to the pinion shaft 11 through a torsion bar 25.

The steering shaft 24 is provided with a passage 37 communicating with a reservoir R, not shown, through a radially extending port 38 formed therein and a passage 39 formed in the valve sleeve 21.

Figure 3A:
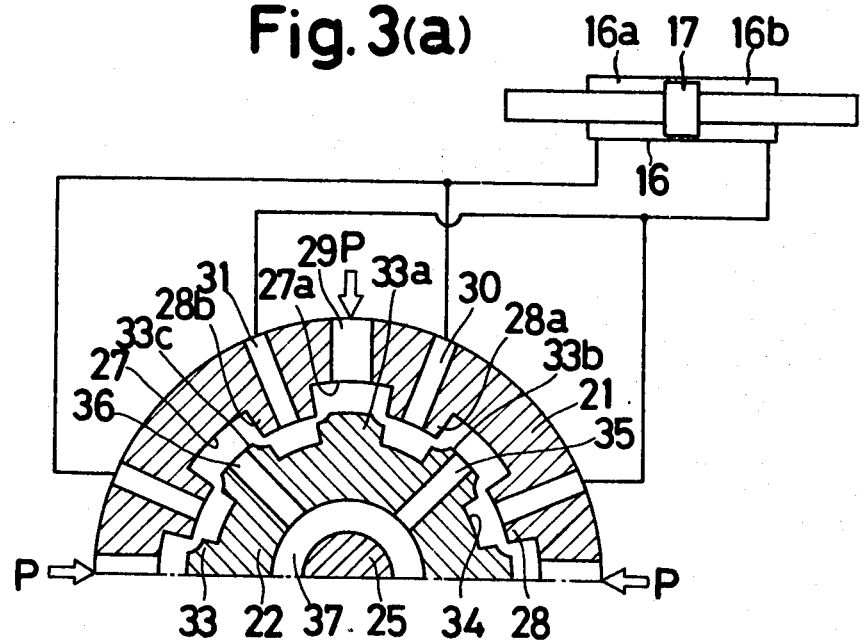
FIG. 3(a) is a cross-sectional view taken along the line III—III of FIG. 2 with a rotor being in a neutral position relative to a valve sleeve, wherein ports are moved into the same plane for purposes of more clearly illustrating the fluid flow within the rotary valve.
Figure 3B:
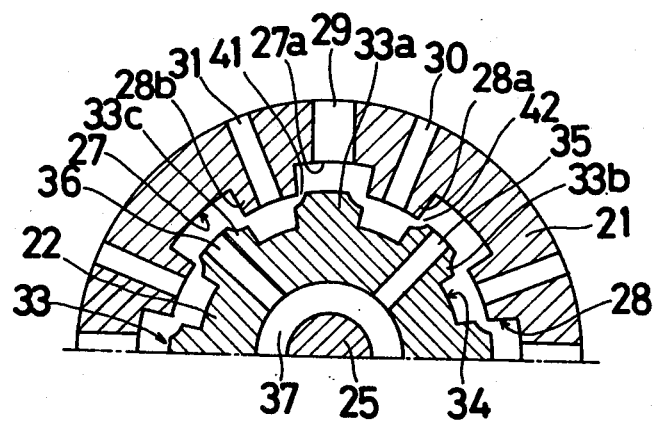
FIG. 3(b) is a sectional view similar to FIG. 3(a) with the rotor turned slightly relative to the valve sleeve.

Referring to FIGS. 3(a) and 3(b), eight axially extending slots 27 are formed on the inner periphery of the valve sleeve 21 at regular intervals, and eight lands 28 are defined between the slots 27. Four of the slots 27 are each formed with a supply port 29 communicating with a supply pump P (not shown) and are designated by reference numeral 27a and hereafter referred to as first slots. The lands 28 adjacent to the first slot 27a are formed with radially extending cylinder ports 30 and 31 communicating with cylinder chambers 16a and 16b of the power cylinder 16, and are designated by reference numerals 28a and 28b.

Eight lands 33 are formed on the outer periphery of the rotor 22 at regular intervals, facing the slots 27 and 27a, and eight slots 34 are defined between the lands 33. The four lands 33 facing the first slots 27a are designated by reference numeral 33a and hereafter referred to as first lands. The lands 33 which are adjacent to the first lands 33a are designated by reference numerals 33b and 33c and are formed with exhaust ports 35 and 36 communicating with the reservoir R (not shown) through the passage 37, the port 38 and the passage 39 shown in FIG. 2. The slots 27 including the first slots 27a are formed in the same configuration, except for the supply ports 29. Similarly, the lands 33 including the lands 33a, 33b and 33c are formed in the same configuration, except for the exhaust ports 35 and 36. Therefore, the elements of every set of a slot 27 and a land 33 facing each other has the same dimensional relationship at any angular position of the rotor 22 relative to the valve sleeve 21.

When the rotor 22 together with the steering shaft 24 are rotated, for example in a counterclockwise direction from the position in FIG. 3(a), the torsion bar 25 is twisted to thereby cause the relative rotation between the rotor 22 and the valve sleeve 21, as shown in FIG. 3(b). The relative rotation causes a reduction in the area of an orifice 41 formed between the first land 33a and the land 28b having the cylinder port 31, and increases the area of an orifice formed between the first land 33a and the land 28a having the cylinder port 30. Simultaneously, the area of an orifice formed between the land 28b and the land 33c having the exhaust port 36 is increased, and the area of an orifice 42 formed between the land 28a and the land 33b having the exhaust port 35 is decreased. It is to be noted that the area of the orifice 41 is equal to that of the orifice 42 at any angular position of the rotor 22 because the lands 33, 33a, 33b and 33c have the same configuration and the lands 28, 28a and 28b have the same configuration. Accordingly, most of fluid from the supply port 29 is equally distributed to the exhaust ports 35 and 36 through the orifices 42 and 41, respectively. The decrease of the areas of the orifices 41 and 42 causes an increase in the fluid pressure in the first slot 27a and the slots 34 facing the cylinder port 30 to thereby actuate the piston 17 in the power cylinder 16 by pressurized fluid distributed through the cylinder port 30.

Figure 1B:
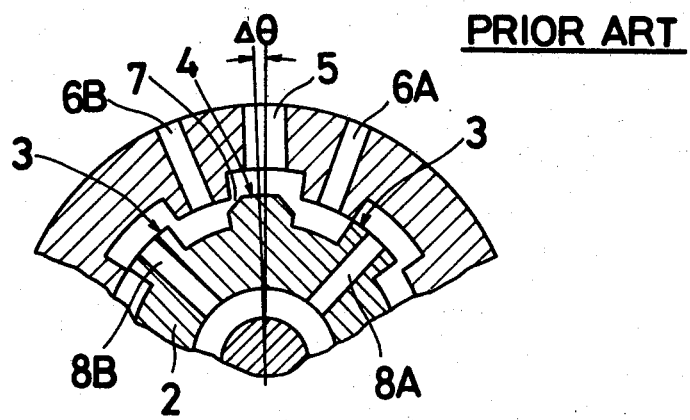
FIG. 1(b) is a cross-sectional view of the conventional rotary valve illustrated in FIG. 1(a) with the rotor turned slightly relative to the valve sleeve.
Figure 4:
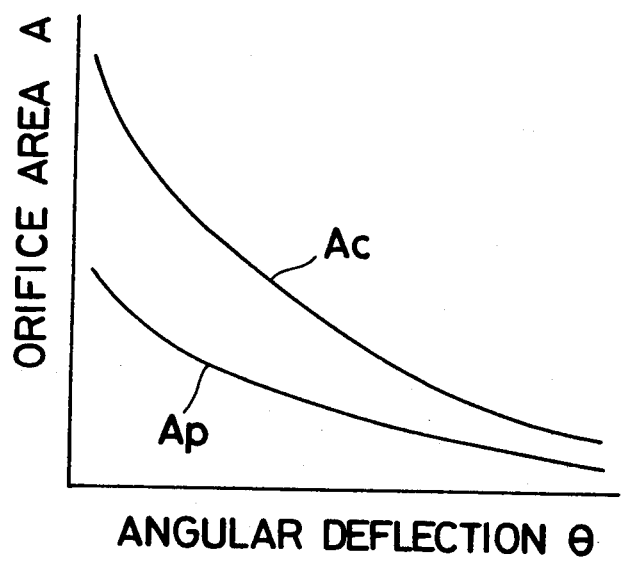
FIG. 4 is a graph showing orifice area curves of a conventional rotary valve shown in FIGS. 1(a) and 1(b) and a rotary valve shown in FIGS. 3(a) and 3(b)

It will be understood that since pressurized fluid from the supply port 29 is discharged to the exhaust ports 35 and 36 through the two orifices 41 and 42, flow volume passing through each orifice 41 and 42 is halved as compared with the conventional rotary valve. Accordingly, the generation of cavitation and hissing noise is avoided. In other words, the area A of each orifice 41 and 42 is described as follows:

$$A = At/N,$$

where $At$ is a total orifice area required to generate a predetermined pressure and $N$ is a number of the lands 33 which are adapted to control fluid pressure applied to the power cylinder 16. As shown in FIG. 4 showing the area Ac of each orifice 7 formed between the land 4 and the valve sleeve 1 of the conventional rotary valve shown in FIGS. 1(a) and 1(b) and the area Ap of each orifice 41 and 42 of the embodiment, it is apparent that due to the provision of the lands 33 being twice as many as the lands 4 of the conventional rotary valve, the area A of each orifice 41 and 42 as well as the flow volume passing therethrough is halved.

Figure 5:
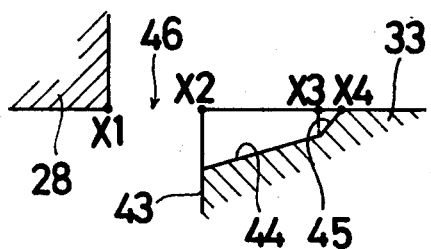
FIG. 5 is an enlarged cross-sectional view of the edge portion of a land in another embodiment.
Figure 6:
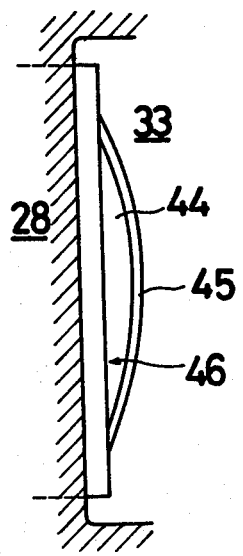
FIG. 6 is a plan view of the land shown in FIG. 5.

FIGS. 5 and 6 show an improved configuration of the lands 33 of another embodiment which has the above advantages of reducing the flow volume passing through each orifice 41 and 42 shown in FIG. 3(b) and further has an advantage of providing an optimum two-step valving characteristic. As every part except the configuration of the lands 33 is similar to that of FIGS. 3(a) and 3(b), only the lands 33 and the related parts are described hereinafter. The lands 33, 33a, 33b and 33c are arranged in underlap relation with the slots 27 and 27a facing thereto at the neutral position, and are each formed at the edge portions thereof with two longitudinally curved slopes 44 and 45, wherein the slope 44 has smaller angle than the slope 45 with respect to the circumferential direction of the rotor 22.

Figure 7:
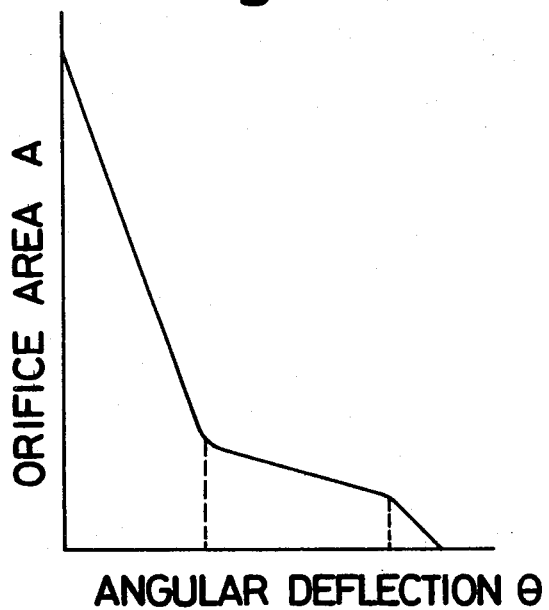
FIG. 7 is a graph showing the relation between the angular deflection of the rotor relative to the valve sleeve and the orifice area.

FIG. 7 shows the orifice area curve achieved by the relative rotation between the valve sleeve 21 and the rotor 22 having the configuration shown in FIGS. 5 and 6. During the rotation of the land 28 of the valve sleeve 21 relative to the land 33 of the rotor 22, the area of an orifice 46 formed therebetween is decreased abruptly from X1 to X2 shown in FIG. 5, moderately from X2 to X3, and again abruptly from X3 to X4. During the relative rotation from X1 to X2, the side wall 43 of the land 33 relatively moves towards the land 28, however, the area of the orifice 46 is not reduced enough to increase the fluid pressure applied to the cylinder 16. Accordingly, the orifice area curve shown in FIG. 7 provides an optimum two-step valving characteristic shown in FIG. 8 wherein the pressure applied to the cylinder 16 is barely increased at the vicinity of the neutral position of the rotor 22, linearly in proportion to the relative rotation between the valve sleeve 21 and the rotor 22 at the intermediate range of the relative rotation thereof, and abruptly after the intermediate range.

Figure 9A:
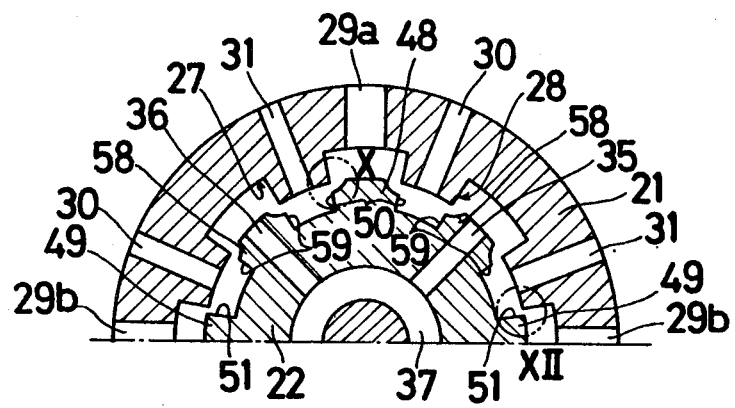
FIGS. 9(a) and 9(b) are cross-sectional views, similar to FIGS. 3(a) and 3(b), of a rotary valve of still another embodiment, with the rotor being in a neutral position and turned slightly relative to the valve sleeve, respectively.
Figure 9B:
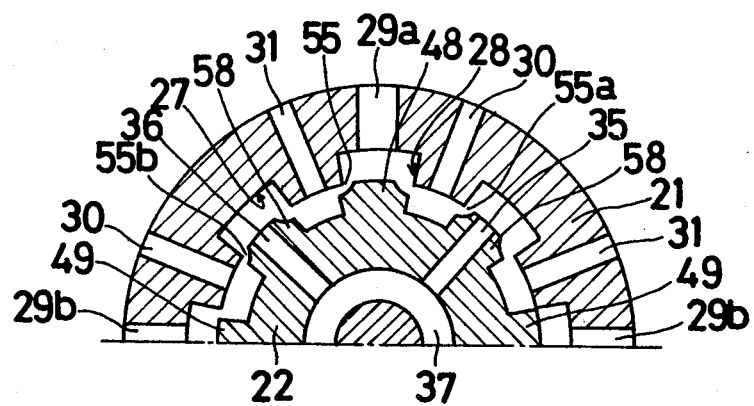
Figure 10:
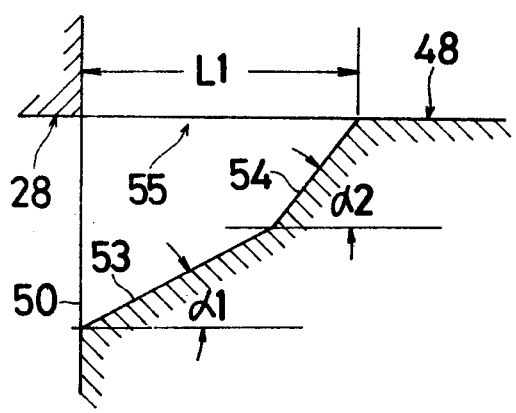
FIG. 10 is an enlarged sectional view of an orifice X shown in FIG. 9(a)
Figure 12:
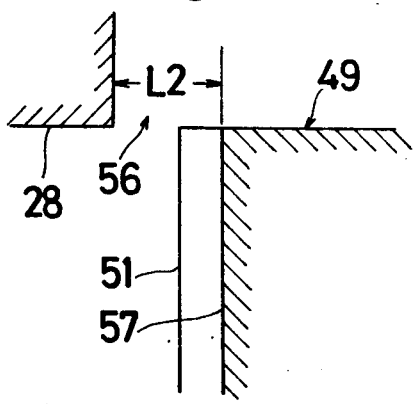
FIG. 12 is an enlarged sectional view of an orifice XII shown in FIG. 9(a)
Figure 11:
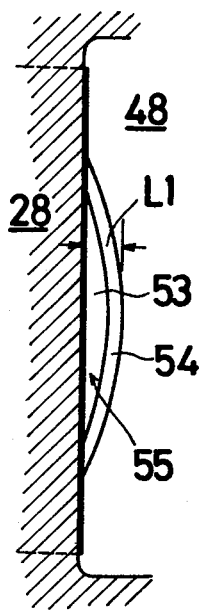
FIG. 11 is a plan view of a land shown in FIG. 10.
Figure 13:
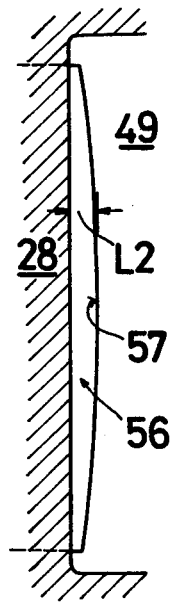
FIG. 13 is a plan view of a land shown in FIG. 12.

FIGS. 9(a) and 9(b) show still another embodiment which has the advantage derived from the foregoing embodiments and further has an advantage of providing an optimum valving characteristic by providing improved edge configurations. More particularly, there are four supply ports 29a and 29b formed in the valve sleeve 21, wherein the side portions 50 of first lands 48 facing the slots 27 which have the supply ports 29a are each formed with two longitudinally curved slopes 53 and 54, as shown in FIGS. 10 and 11. The slopes 53 and 54 are inclined at angles $\alpha1$ and $\alpha2$ with respect to the circumferential direction of the rotor 22. The side portions 59 of lands 58 which are adjacent to the first land 48 are formed into the same configuration as those of the first land 48. The side portions 51 of second lands 49 facing the slots 27 which have the supply ports 29b are each formed with a longitudinally curved and radially extending surface 57, as shown in FIGS. 12 and 13. The rotation of the rotor 22 relative to the valve sleeve 21 from the neutral position shown in FIGS. 10 through 13 causes an area A1 of an orifice 55 formed between the first land 48 and the land 28 to be decreased, gradually initially, and then abruptly, towards the maximum rotation thereof, and further causes an area A2 of an orifice 56 formed between the second land 49 and the land 28 to be decreased more abruptly than the area A1 of the orifice 55. The length L1 taken from the neutral position to a position where the first land 48 closes the orifice 55 is set larger than the length L2 taken from the neutral position to a position where the second land 49 closes the orifice 56, so that fluid flow passing through the orifice 55 lasts longer than that passing through the orifice 56.

It is to be noted that the area of an orifice 55a formed between the land 58 and the land 28 of the valve sleeve 21 is varied at the same rate as the area of the orifice 55 formed between the first land 48 and the land 28, so that, even after fluid flow from the supply port 29b to the exhaust port 35 is shut off due to the rotation of the second land 49 relative to the valve sleeve 21, fluid is able to pass through the orifices 55 and 55a formed between the lands 48 and 58 and the valve sleeve 21. Therefore, flow volume passing through each one of the orifices 55 and 55a is reduced to two-thirds as compared with that of the conventional rotary valve to thereby avoid the generation of cavitation and hissing noise.

Figure 14:
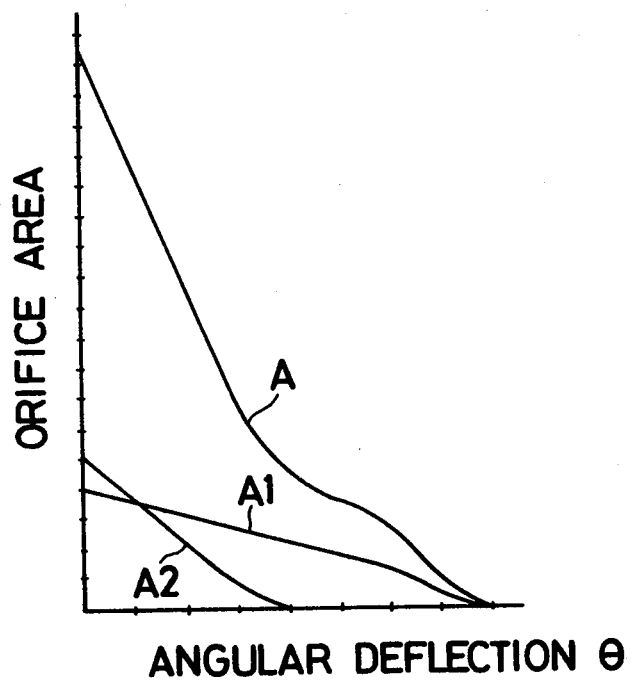
FIG. 14 is a graph showing orifice area curves of the rotary valve shown in FIGS. 9(a) and 9(b).

FIG. 14 shows the orifice area curves A1 and A2 of the orifices 55 and 56, and a total orifice area A.

It will be understood that the area A2 of the orifice 56 is decreased more abruptly than the area A1 of the orifice 55, and even after the orifice 56 is closed by the land 49, the orifice 55 is still open. It is noted that the total orifice area A is described as follows:

$$A = 2(A1 + A2),$$

since there are two sets of the orifices 55 and 56. It will be understood from the FIG. 14 that the pressure applied to the power cylinder 16 is hardly increased at the vicinity of the neutral position and linearly in proportion to the rotation of the rotor 22 relative to the valve sleeve 21 at the intermediate portion of the rotation thereof, and abruptly after the linear portion.

Thus, according to the third embodiment, an optimum two-step characteristic of fluid pressure applied to the power cylinder 16, whose pressure varies in accordance with the rotation of the rotor 22 relative to the valve sleeve 21, is attained by combining two orifice area curves A1 and A2 without interference of the generation of cavitation and hissing noise. Furthermore, it is possible to change the characteristic by altering the configuration of one or both of the first and second lands 48 and 49 so as to provide different valving characteristics for various vehicles.

In the above embodiments, in order to obtain an optimum two-step characteristic, the lands of the rotor are formed into an improved configuration, however, the present invention is not limited to the shown embodiments and the lands of the valve sleeve may be formed into the predetermined configurations, rather than of the lands of the rotor.

In a rotary valve according to the present invention, as mentioned previously, the area of an orifice located between a supply port and one cylinder port is varied at the same rate as the area of an orifice located between the other cylinder port and an adjacent exhaust port at any angular position of a rotor relative to the valve sleeve. Accordingly, fluid supplied from the supply port is always discharged through at least two orifices so that reduced flow volume passing through each one of the orifices can be achieved, thereby to avoid generation of cavitation and hissing sound.

Furthermore, according to the present invention, in addition to the advantage of reducing flow volume passing through each orifice to thereby avoid generation of cavitation and hissing noise, a rotary valve having an optimum valving characteristic is provided by combining two different orifice area curves formed between the first land and the valve sleeve and between the second land and the valve sleeve during rotation of the rotor relative to the valve sleeve, wherein the first and second lands have different configurations relative to each other so as to form two orifices having different orifice areas.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A rotary valve for a power steering system, comprising:
    an outer valve member;
    an inner valve member rotatably carried in said outer valve member;
    four supply ports formed in one of said outer and inner valve members at regular intervals;
    four pairs of cylinder ports formed in one of said outer and inner valve members at regular intervals, each pair of said cylinder ports being disposed at both sides of a corresponding one of said four supply ports in a circumferential direction of said inner valve member;

at least four exhaust ports formed in one of said outer and inner valve members and each disposed between successive two of said cylinder ports;

eight axially extending slots formed on said inner periphery of said outer valve member at regular intervals for defining eight axially extending outer lands between said eight slots; and eight axially extending slots formed on said outer periphery of said inner valve member at regular intervals for defining eight axially extending inner lands between said eight slots of said inner valve member;

said eight inner lands including two diametrically opposed pairs of supply control lands each for controlling the distribution of fluid from one of said four supply ports to an associated pair of said cylinder ports;

each of one diametrically opposed pair of said supply control lands having a wider circumferential length than that of each of other inner lands, whereby each of said one diametrically opposed pair of said supply control lands begins to discontinue the flow of fluid, at one circumferential edge thereof while each of said other inner land still permits the flow of fluid at a corresponding one circumferential edge thereof.

2. A rotary valve as set forth in claim 1, wherein:

each of the other diametrically opposed pair of said supply control lands is formed at each of circumferential edges thereof with two longitudinally curved slopes having different angles of inclination with respect to the circumferential direction of said inner valve member.

* * * * *